United States Patent
Sherwood, Jr.

(10) Patent No.: US 7,029,634 B2
(45) Date of Patent: *Apr. 18, 2006

(54) FILTER SYSTEM AND PARTICULATE FILTER UNIT THEREFOR

(75) Inventor: Walter J. Sherwood, Jr., Troy, NY (US)

(73) Assignee: Starfire Systems, Inc., Watervliet, NY (US)

(*) Notice: Subject to any disclaimer, the term of this patent is extended or adjusted under 35 U.S.C. 154(b) by 655 days.

This patent is subject to a terminal disclaimer.

(21) Appl. No.: 09/944,779

(22) Filed: Aug. 31, 2001

(65) Prior Publication Data

US 2002/0046555 A1  Apr. 25, 2002

Related U.S. Application Data

(63) Continuation-in-part of application No. 09/631,794, filed on Aug. 3, 2000, now Pat. No. 6,471,918.

(51) Int. Cl.
*B01D 53/56* (2006.01)
*B01D 53/94* (2006.01)
*B01D 53/96* (2006.01)

(52) U.S. Cl. ............. 422/177; 422/170; 422/171; 422/178; 55/DIG. 30

(58) Field of Classification Search ......... 422/168–171, 422/177, 178; 55/DIG. 10, DIG. 30, 523, 55/486; 60/295, 297, 299, 303, 311
See application file for complete search history.

(56) References Cited

U.S. PATENT DOCUMENTS 3,675,398 A * 7/1972 Giarrizzo ............... 55/DIG. 30
4,544,388 A * 10/1985 Rao et al. .................... 55/282
5,961,931 A * 10/1999 Ban et al. .................. 422/171
6,056,796 A * 5/2000 Chiang et al. ............... 55/302
6,471,918 B1 * 10/2002 Sherwood .................. 422/171

* cited by examiner

*Primary Examiner*—Hien Tran
(74) *Attorney, Agent, or Firm*—Spencer K. Warnick; Hoffman, Warnick & D'Alessandro LLC

(57) ABSTRACT

The invention provides a filter system and particulate filter unit therefor. The filter system may act as a purifier and a muffler for heavy and light duty diesel vehicles. The invention includes one or more combination filter units that remove particulates and nitrogen oxides in successive passes before the gas exits. A particulate filter unit may be used that removes additional particulates.

15 Claims, 10 Drawing Sheets

FILTER SYSTEM AND PARTICULATE FILTER UNIT THEREFOR

This application is a continuation-in-part application of U.S. Ser. No. 09/631,794, filed Aug. 3, 2000 now U.S. Pat. No. 6,471,918.

BACKGROUND OF THE INVENTION

1. Technical Field

The present invention relates generally to exhaust filtering and, in particular, to a filter system, regeneration system for the filter system, a combined soot removing system and applications of those systems. In addition, this invention relates to a particulate filter unit usable with one or more second stage particulate and nitrogen oxide filter units.

2. Related Art

Filtering of exhaust is a well-known mechanism to reduce pollution. Related art devices have suffered from a number of drawbacks. For instance, most of the filters are adaptations of substrates used for automotive catalytic converters in which alternating channels are plugged to force the gas through the substrate walls. A number of other filter configurations and materials have been tried, but none have been robust enough or cost effective enough for widespread use. Also, once the particulates or other materials have been collected, they must be removed before the filter can function effectively. This is typically accomplished by igniting and burning the collected burnable particulates using a variety of techniques. Current techniques in the art of regeneration are expensive, complex, and many are outright hazardous, e.g., some use explosive, compressed gas or highly flammable (compared to diesel fuel) liquids.

In addition, the catalytic converter materials were designed to operate at much lower temperatures than can be reached during an uncontrolled regeneration (rapid, uncontrolled burning of the soot collected in the filter). In many cases, the filter media cracks, melts, or is otherwise damaged by either vehicle induced vibration or very high temperatures. In addition, many filters include two or more integral filter sections for filtering different pollutants. Unfortunately, these filters make regeneration difficult. Further, when one filter section is in need of repair, all of the sections must be replaced.

Another problem with related art devices is their inability to accommodate different applications because of their inflexible size. A new mold must be made for each different size filter unit, which dramatically increases cost or limits the ability to tailor the filter for the application. U.S. Pat. No. 5,250,094 to Chung et al. discloses a filter construction having a number filter sections 114. Unfortunately, the device is limited in application by the size of the enclosure.

Related art devices also do not adequately provide a regeneration system that is safe and controllable. In particular, U.S. Pat. No. 5,820,833 to Kawamura includes an electric wire net that is integral with a filter, i.e. in-filter regeneration. Since the regeneration system and filter are inseparable, the device may be subject to vibrations that may induce damage. U.S. Pat. No. 5,394,692 to Teuber-Ernst discloses a separate regeneration system that is fired by an explosive gas, which is an unsafe situation when in an environment where other fuel sources are nearby. Another problem with these regeneration systems is their inability to adequately control the rate of burn and, therefore, the temperature of the filter during regeneration. Many filters cannot withstand the repeated exposure to higher temperatures caused by some regeneration systems. Further, the potential for regeneration to proceed uncontrollably is potentially dangerous due to the extreme amount of heat that is generated by the burning soot.

Accordingly, there is a need in the art for a filter that includes separate filtering sections for ease of repair and regeneration. Furthermore, there is a need for a readily size-adjustable filter system. It would also be advantageous if this filter could be retrofitted to a variety of exhaust producing devices that exhaust a variety of different pollutants. Moreover, there is also a need for a safe and controllable regeneration system. A system that combines the above filter and regeneration system would also be advantageous.

In addition, a system with improved particulate removal would be advantageous.

SUMMARY OF THE INVENTION

The invention provides an exhaust filter system that serves as a particulate trap, a muffler, and a purifier. The filter system design removes the structural load from the filter. The invention provides for longer filter life, less complicated regeneration, less modification to an exhaust producing device for retrofitting, and much lower life cycle costs to the end user. In addition, the filter system can tolerate much higher temperatures than conventional filter systems thereby increasing the durability and use range of the filters. The invention also provides a particulate filter unit to remove additional particulates.

In a first aspect of the invention is provided a filter unit for an exhaust removing filter system having one or more attachable units for varying the size of the filter system, the filter unit comprising: a housing; a plurality of concentrically arranged particulate filters within the housing; a plurality of first passages passing adjacent at least one particulate filter and opened to a first end of the housing; and a plurality of second passages passing adjacent at least one particulate filter and opened to a second end of the housing. Exhaust passes through one of the particulate filters as the exhaust moves from the first passages to the second passages.

A second aspect of the invention includes a filter system for removing soot from exhaust of an exhaust producing device, the filter system comprising one or more attachable units for varying the size of the filter system, the system comprising: a particulate filter unit; and one or more combination particulate and nitrogen oxide filter units.

A third aspect of the invention provides a filter system for removing soot from exhaust of an exhaust producing device, the filter system comprising one or more attachable units for varying the size of the filter system, the system comprising: a first stage unit housing; a plurality of concentrically arranged particulate filters within the first stage unit housing; a plurality of first passages passing adjacent at least one particulate filter and opened to a first end of the first unit stage housing; a plurality of second passages passing adjacent at least one particulate filter and opened to a second end of the first unit stage housing; whereby exhaust passes through a particulate filter as the exhaust moves from the first passages to the second passages; and one or more second stage units, each second stage unit including: a second stage unit housing; a particulate filter section positioned within the second stage unit housing; and a nitrogen oxide filter section having a gas-impervious inner cylinder spaced within the particulate filter section and a nitrogen-oxide removing catalyst positioned within the inner cylinder.

A fourth aspect of the invention includes a filter unit for an exhaust removing filter system having one or more attachable units for varying the size of the filter system, the filter unit comprising: a housing; a plurality of concentrically arranged particulate filters within the housing; a set of intake openings in a first end of the housing, each intake opening communicating with a passage extending adjacent an intake side of at least one particulate filter; a set of output openings in a second end of the housing, each output opening communicating with a passage extending adjacent an output side of at least one particulate filter; and wherein exhaust enters the intake openings, passes through a respective particulate filter and exits through the output openings.

A fifth aspect of the invention is directed to a filter system for removing soot from exhaust of an exhaust producing device, the filter system comprising one or more attachable units for varying the size of the filter system, each unit including: means for housing filter components; means for filtering particulates positioned within the means for housing; and means for filtering particulates and nitrogen oxide.

A sixth aspect of the invention is directed to a filter system for removing soot from exhaust of an exhaust producing device, the filter system comprising one or more attachable units for varying the size of the filter system, the system comprising: a particulate filter unit including a particulate filter unit housing; a plurality of concentrically arranged particulate filters within the particulate filter unit housing; a plurality of first passages passing adjacent at least one particulate filter and opened to a first end of the first unit stage housing; a plurality of second passages passing adjacent at least one particulate filter and opened to a second end of the first unit stage housing; whereby exhaust passes through a particulate filter as the exhaust moves from the first passages to the second passages; and one or more combination filter units each including: a combination filter unit housing having an outer shell and a coupling adapted to attach a unit to an adjacent unit; a particulate filter section positioned within the combination filter unit housing; a porous cylinder for supporting an inner portion of the particulate filter section; a gas-impervious inner cylinder spaced within the porous cylinder; and a nitrogen-oxide removing catalyst positioned within the inner cylinder, wherein exhaust gases pass radially through the particulate filter section and longitudinally through the nitrogen oxide filter.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., which are disclosed simply as an example of the preferred embodiment.

Figure 2:
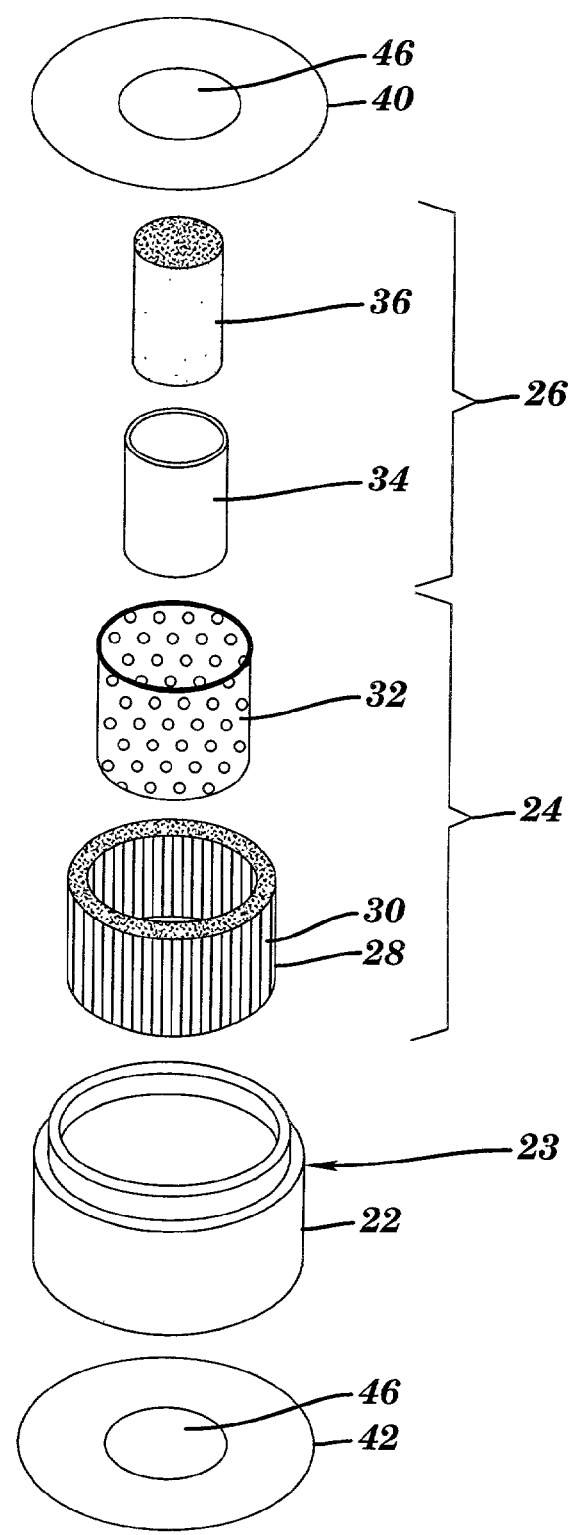
FIG. 2 is an exploded view of a unit of the filter system.
Figure 3:
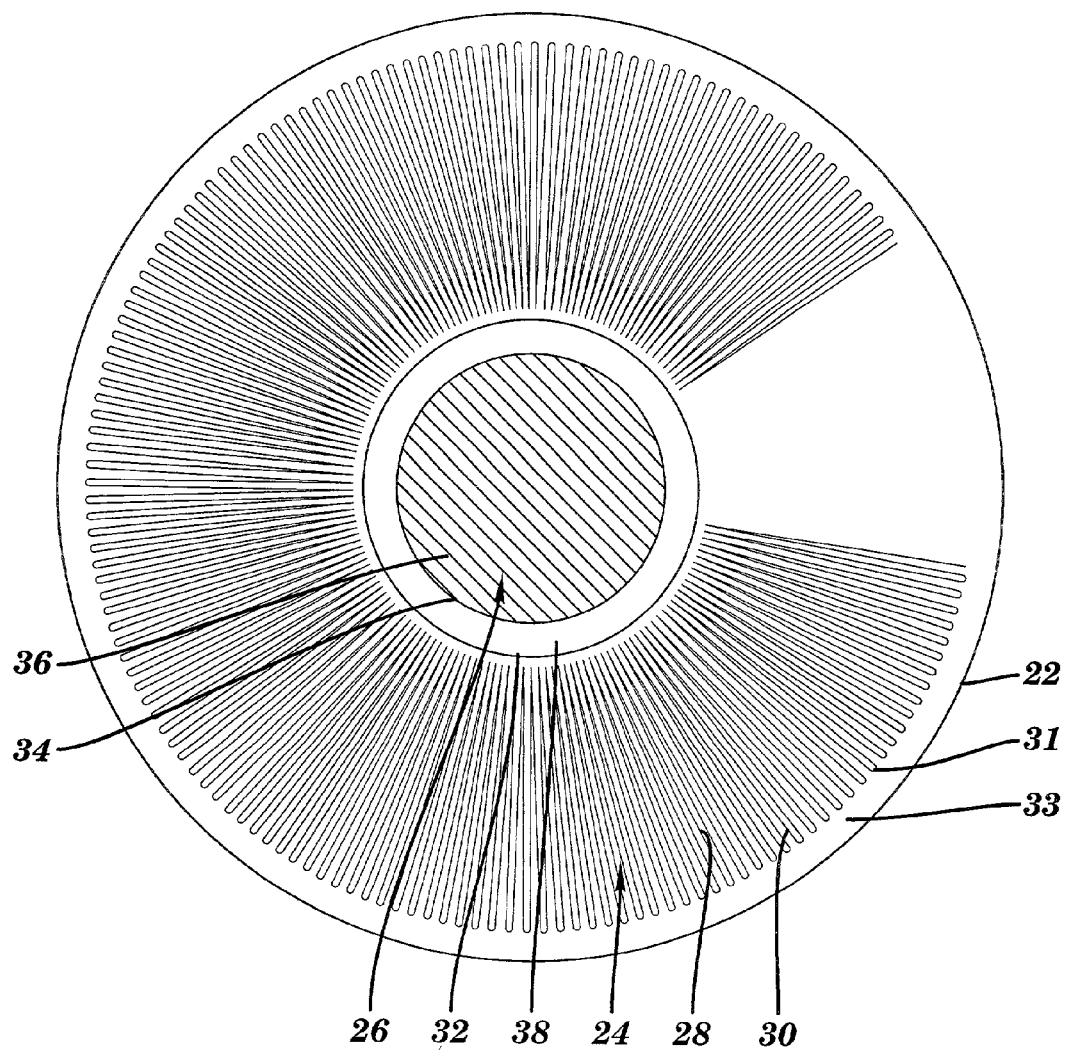
FIG. 3 is a cross-sectional view of a unit of the filter system.
Figure 4:
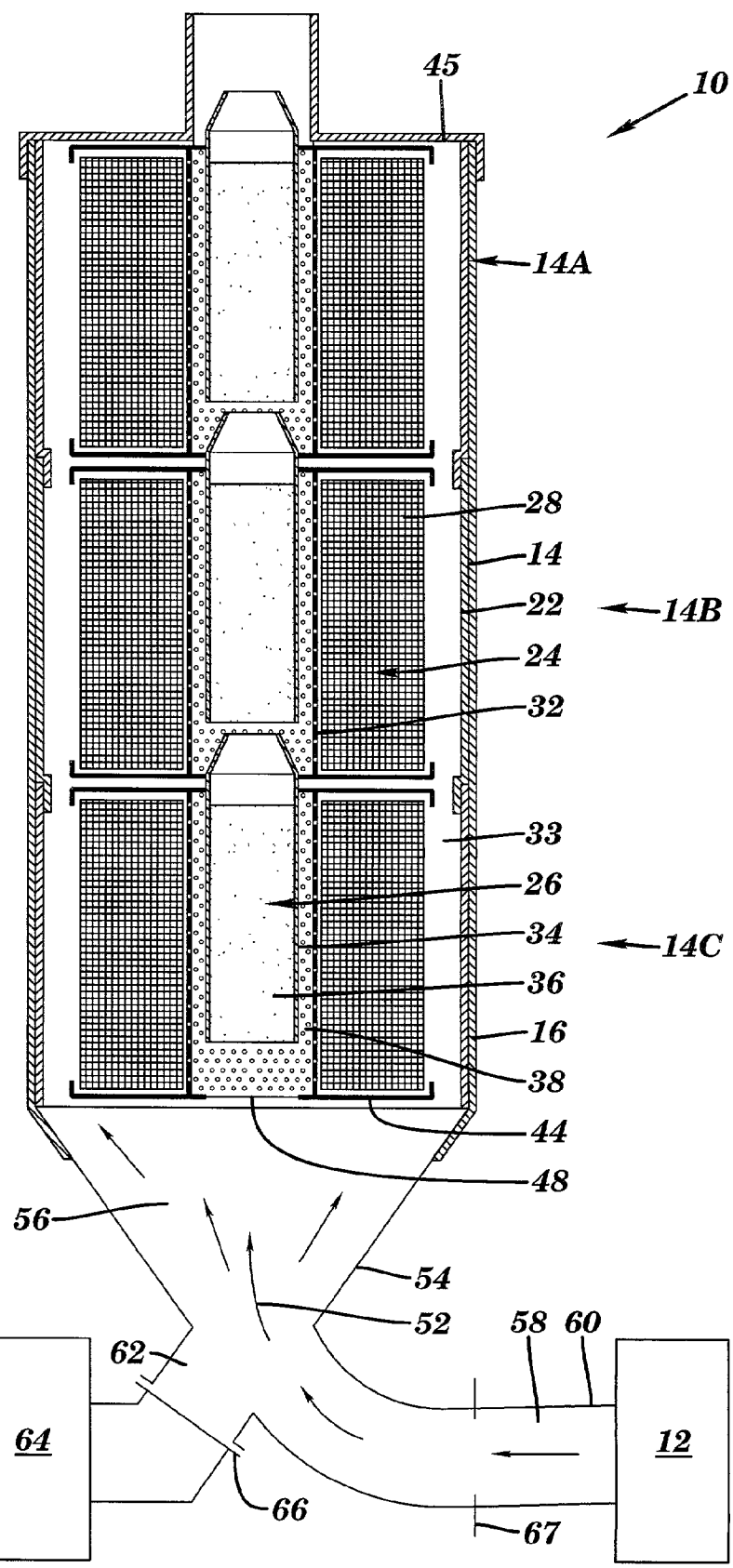
FIG. 4 is a detailed cross-sectional view of a three unit filter system.

For convenience, the disclosure will be broken down into the following headings for organizational purposes only:
  I. Filter System
  II. Regeneration System
  III. Combined Soot Removing System
  IV. Applications
  V. Particulate Filter Unit I. Filter System:

Referring to the FIGS. 1–5, a filter system 10 for removing soot from the exhaust of an exhaust producing device 12 is shown. Filter system 10 includes one or more attachable units 14 for varying the size of filter system 10 that are preferably cylindrical in cross-section. As shown, a number of units 14A, 14B, 14C, etc. may be sealingly coupled together to create a filter. In this case, a shell support 18 may be provided to secure a lower unit 20. Alternatively, as shown in FIG. 4, a number of units 14 can be stacked into a shell 16 to produce filters of various capacities. Shell 16 may be a standard muffler shell of, for instance, a diesel engine driven truck. Shell 16 is preferably made of standard muffler steel.

Figure 1:
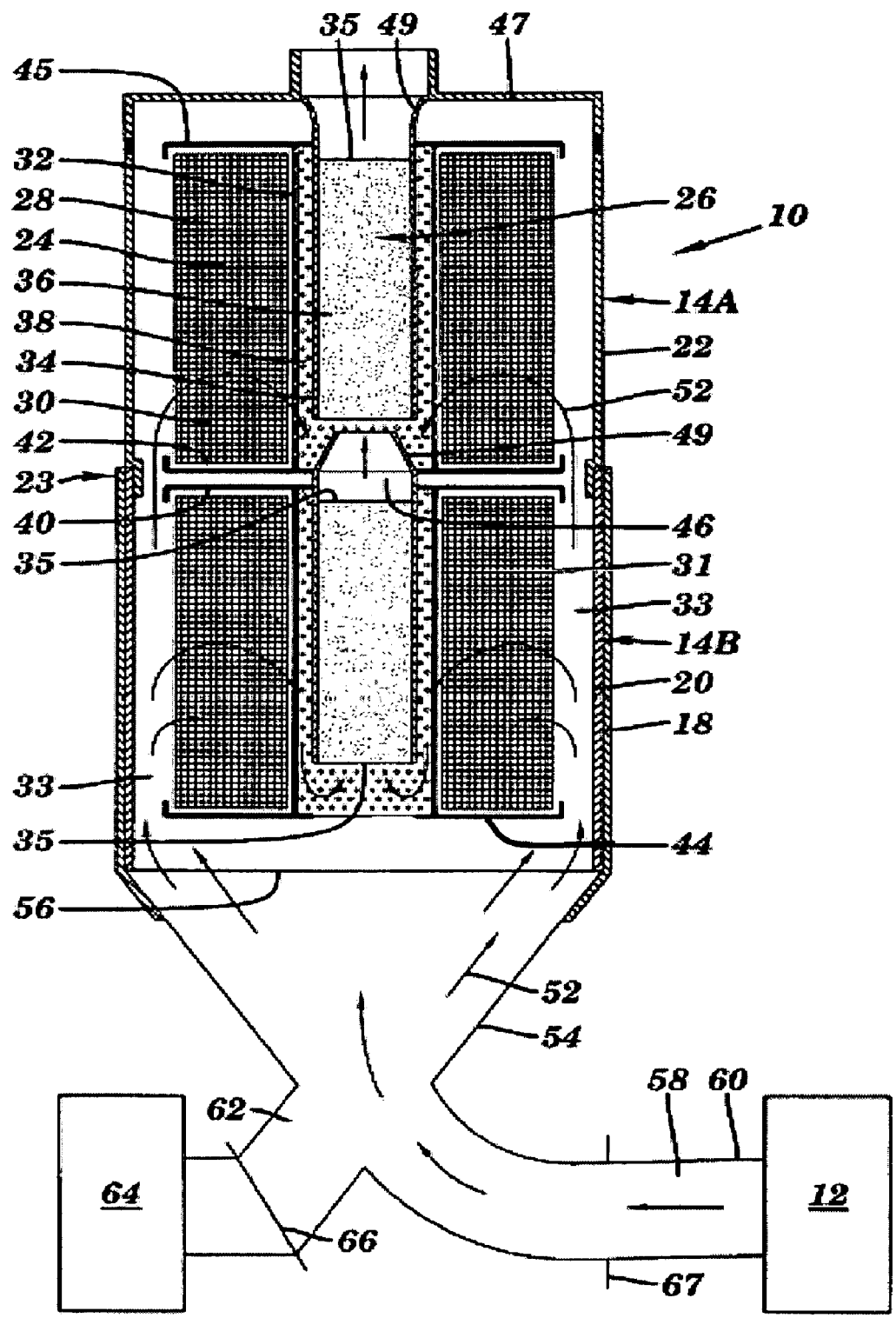
FIG. 1 is a cross-sectional view of a filter system in accordance with the invention.

As shown best in FIGS. 1–3, each unit 14, 14A, 14B, etc. includes a housing 22, a particulate filter section 24 and a nitrogen oxide (NOX) filter section 26. Housing 22 encloses filter sections 24, 26 and is preferably made of a corrosion-resistant metal such as high temperature, stainless steel like AISI types 301–325 or 401–440. Each housing 22 also includes a coupling 23 for sequentially attaching a unit 14A to an adjacent unit 14B. Coupling 23 may take a variety of forms known to those skilled in the art; as shown, coupling 23 includes an interference fit-type coupling such that each unit 14 has a recessed portion that fits into an expanded portion of an adjacent unit 14. This provides structural rigidity and support for the stack. Other mechanisms of attachment such as clips may also be provided.

Particulate filter section 24 includes a filtering section 28 having either a set of radially oriented plates or a set of radially oriented pleats 30, and a porous cylinder 32 for supporting an inner surface of plates or pleats 30. Plates or pleats 30 are composed of low back pressure filter media such as woven ceramic fiber, ceramic fiber cloth, ceramic fiber paper/felt or a combination of those materials. The fibers are preferably one of the following ceramic materials: aluminum oxide, silicon dioxide, mullite (a mixture of aluminum oxide and silicon dioxide), aluminosilicate (another mixture of aluminum oxide and silicon dioxide), silicon carbide, silicon carbonitride, or silicon oxycarbide.

Ceramic fiber plates or pleats 30 are preferably rigidized, protected, and rendered more durable by a thin coating of ceramic. This media is further improved and stiffened by the use of a coating of pre-ceramic polymers such as that disclosed in U.S. Pat. No. 5,153,295 to Whitmarsh et al., hereby incorporated by reference. Preferably, the pre-ceramic polymer is selected from the group comprising: silicon carbide, oxycarbide, aluminosilicate and alumina. It should be recognized that other pre-ceramic polymers may also be possible. The ceramic coating and pre-ceramic polymers are fired to form a ceramic coating on plates or pleats 30. Filtering section 28 is then more resistant to damage than typical materials used for filters because the ceramic protects the fibers from the exhaust gas, prevents the fibers from rubbing against each other, and prevents plates or pleats 30 from flexing sufficiently to damage each other. An outer surface 31 of plates or pleats 30 has a smaller outer diameter than an inner diameter of housing 22 to create a substantially annular chamber 33 for passage of exhaust therebetween. Couplings 23 are also separated from outer surface 31 of plates or pleats 30 to provide for the continuation of annular chamber 33 between units 14.

Porous cylinder 32 is preferably constructed of a corrosion-resistant metal such as high temperature, stainless steel like AISI types 301–325 or 401–440.

Nitrogen oxide filter section 26 includes a gas-impervious inner cylinder 34 and a nitrogen-oxide removing catalyst 36 positioned within inner cylinder 34. Inner cylinder 34 is spaced from an inner portion of particulate filter section 24 to create a substantially annular chamber 38 therebetween, i.e., cylinder 34 has a smaller diameter than an inner diameter of porous cylinder 32. Inner cylinder 34 is preferably constructed of a corrosion-resistant metal such as high temperature, stainless steel like AISI types 301–325 or 401–440, and has open ends 35. NOX catalyst 36 is preferably composed of a non-porous ceramic material that is bonded into gas-impervious cylinder 34. Examples of material suitable for catalyst 36 are: cordierite, mullite, silicon carbide and aluminum oxide. It should be recognized, however, that other types of ceramic catalyst support media may be used and any nitrogen oxide catalyst material available commercially may be suited for use with the invention.

Each unit 14 also preferably includes a first, upper end cap 40 and a second, lower end cap 42. End caps 40, 42 function to seal off the ends of plates or pleats 30 and annular chamber 38. Additionally, each end cap 40, 42 includes a central aperture 46 that acts to position nitrogen oxide filter section 26 and, in particular, inner cylinder 34, such that section 26 is substantially concentric within particular filter section 24.

Figure 5:
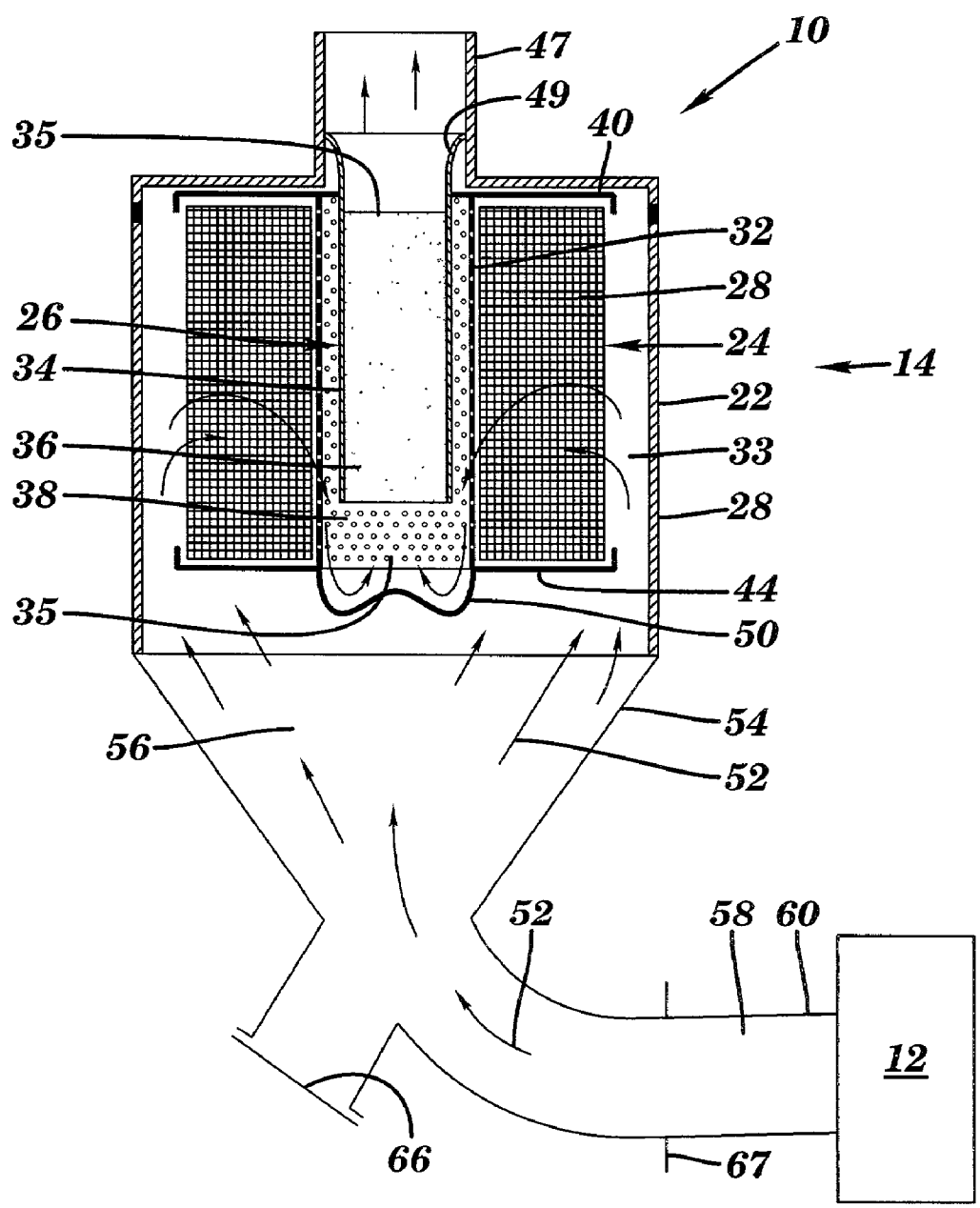
FIG. 5 is a cross-sectional view of an alternative aspects of a unit of the filter system.

A special end cap 44, referred to as a stop cap, may be provided on a lowermost unit 14, as shown in FIGS. 1, 4 and 5. Stop cap 44 does not include a central aperture 46 and may be formed as a solid member or may include a plug 48, shown in FIG. 4, to close aperture 46. As illustrated in FIG. 5, stop cap 44 may also include an exhaust directing formation 50 for directing exhaust into nitrogen oxide filter section 26. Formation 50 may be created by, for example, stamping a solid stop cap 44 or plug 48. Another stop cap 45, shown in FIG. 1, may be provided to seal an uppermost unit 14 of filter system 10. Stop cap 45 preferably seals to housing 22 of the uppermost unit 14, as shown in FIG. 1, to prevent exhaust 52 from escaping through annular chamber 33. Sealing is provided by the use of compressible fiber gasketing, rigidized fiber felt or a polymer slurry. Alternatively, as shown in FIG. 5, a filter system output shroud 47 may be coupled directly to housing 22 to eliminate the need for stop cap 45. A vent port 49 may also be provided on gas impervious cylinder 34 to mate with an adjacent unit 14 and, hence, direct exhaust 52 from one NOX filter section 26 to the next (shown in FIG. 1), or to direct exhaust 52 through shroud 47 (shown in FIG. 5).

Each end cap 40, 42, 44, 45 and plug 48 are preferably made of a corrosion-resistant metal such as high temperature, stainless steel like AISI types 301–325 or 401–440. Filtering section 28 may be sealed to the appropriate caps 40, 42, 44, 45 by the use of compressible fiber gasketing, rigidized fiber felt or a polymer slurry.

Operation of filter system 10 will be described with reference to FIGS. 1, 4 and 5. In operation, exhaust 52 from an exhaust producing device 12 is directed to filter system 10 by an adaptor 54. Adaptor 54 is preferably made of standard muffler steel. Adaptor 54 is preferably in the form of an inverted Y with three openings 56, 58 and 62. First opening 56 is shaped and sized to mate with a lowermost unit 14 of filter system 10; second opening 58 is shaped and sized to mate with an exhaust port 60 of exhaust producing device 12; and third opening 62 is shaped and sized to mate with a regeneration system 64, as will be described below. As will be recognized by those skilled in the art, adapter 54 may also require other adapter components (not shown) for proper coupling to filter system 10, exhaust producing device 12 and regeneration system 64.

Referring to FIG. 1, during operation of filter system 10, third opening 62 is closed by a flange or valve 66. Exhaust 52 from exhaust producing device 12 is communicated by adapter 54 to filter system 10 where it enters annular chamber 33 between housing 22 and particulate filter section 24. Exhaust 52 may pass from one unit 14B to an adjacent unit 14A within annular chamber 33, and so on through all of the units in system 10. As exhaust 52 is routed through chamber 33, it radially enters particulate filter section 28, i.e., it moves inwardly, where particulates from the exhaust 52, such as soot, sulfates, oxides and other particulates are removed. Subsequently, exhaust 52 is routed through porous cylinder 32 and into annular chamber 38. Because of the sealed ends of annular chamber 38, exhaust 52 is routed into NOX filter section 26 at an open end 35 of gas impervious cylinder 34 where it passes longitudinally through section 26. NOX catalyst 36 reacts with and removes nitrogen oxides (NOX) from exhaust 52. Further removal of NOX is provided as exhaust 52 passes from unit, e.g., 14B, to another unit, e.g., 14A and so on through all units 14, i.e., exhaust 52 that passes through lower units 14 is subject to repeated NOX removal as it passes through adjacent unit(s) 14. The resulting exhaust gas, when it emerges from filter system 10 will be significantly depleted in NOX and particulates. Another advantage of filter system 10 is that it also acts to muffle noise from exhaust producing device 12, i.e., system 10 acts as a muffler and a filter.

It should be recognized that any number of units 14, 14A, 14B, etc. may be stacked together to form a filter. The particular illustrations of two units (FIG. 1), three units (FIG. 4) and one unit (FIG. 5) are for illustration purposes only. Furthermore, as shown in FIG. 1, NOX filter section 26 may be shorter than particulate filter section 24 to promote routing of exhaust 52. However, this is not necessary, as shown in FIG. 5, where stop cap 45 includes formation 50 to promote routing of exhaust 52 to nitrogen oxide filtering section 26.

Figure 6:
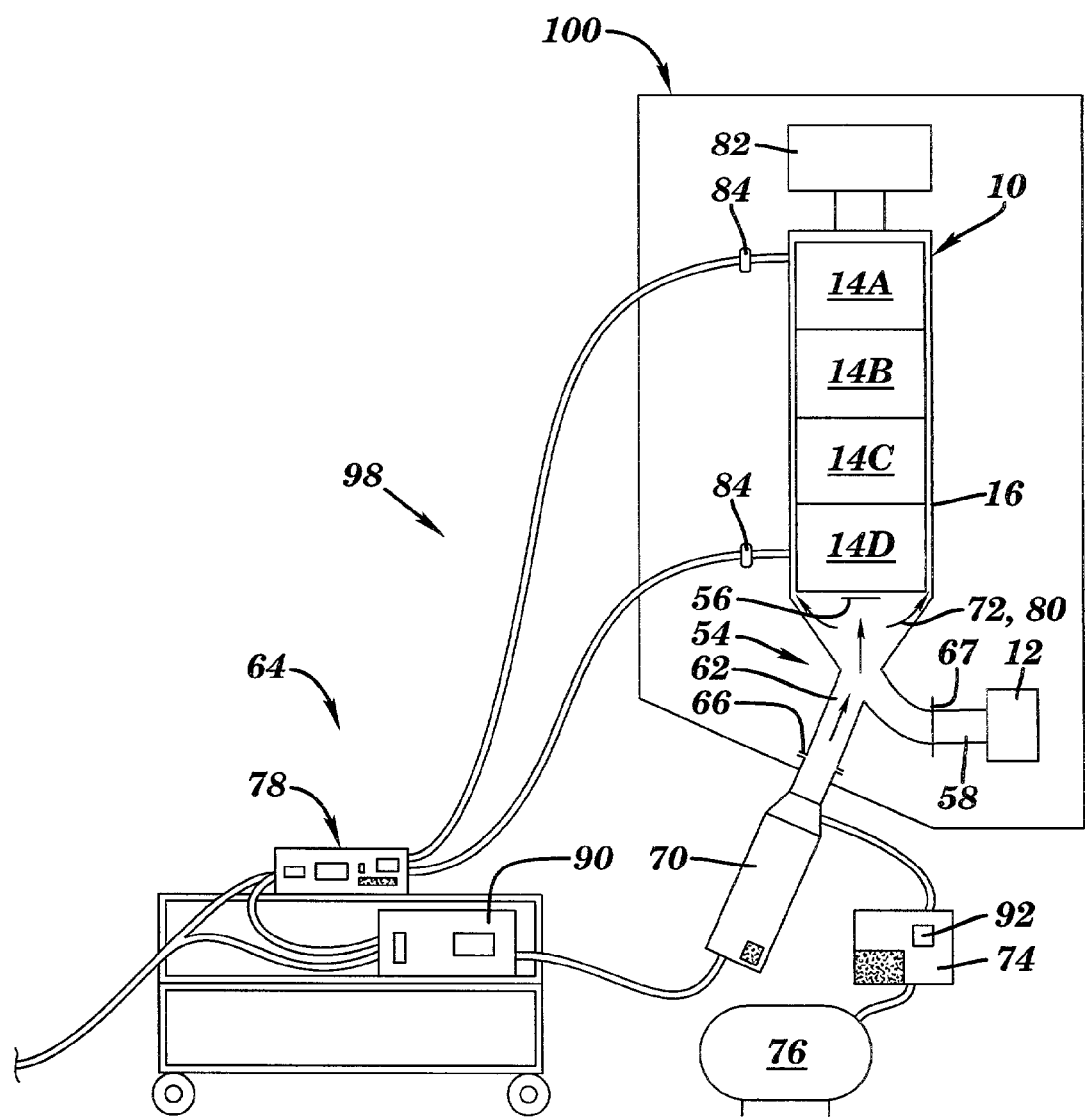
FIG. 6 is a side view of a soot removing system including a regeneration system in accordance with the invention.

II. Regeneration System:

Referring to FIG. 6, a regeneration system 64 of the invention is shown in greater detail. Regeneration entails the burning out of soot from a filter, such as filter system 10, to restore the filtration capacity of a filter. Regeneration system 64 includes an electrically powered regenerator or heat source 70 for producing heated gas 72 to be passed through a filter such as filter system 10 to regenerate the filter. Regenerator 70 preferably includes an electric powered metal wire, an electric powered ceramic element or an electric powered intermetallic element having a power rating of 1000–15,000 watts.

Regeneration system 64 also preferably includes: adaptor 54; an air pump or blower 74 for pressurizing heated gas 72; a source of inert gas 76; and a computer control system 78. Adapter 54, as described above, may include a second flange or valve 67 for closing off second opening 58 to exhaust producing device 12 during regeneration. As an alternative, adaptor 54 may simply be disconnected from exhaust producing device 12.

Source of inert gas 76 is preferably provided to supply inert gas 80 with heated gas 72 to control the burn rate of soot within filter system 10, i.e., the amount of inert gas 80 controls the temperature of the filter by controlling the amount of oxygen available for burning. A preferred inert gas for use in system 64 is nitrogen.

Computer-control system 78 operates to control the regeneration process by controlling: regenerator or heat source 70, the temperature of filter system 10 and air pump or blower 74. In order to control the above parameters, computer control system 78 may include: a thermocouple 84 for measuring temperature in filter system 10 during regeneration; a heat source temperature controller 90; and an air supply controller 92. Thermocouple(s) 84 may be provided anywhere along filter system 10 to accurately determine temperature of filter system 10, e.g., within each unit 14. Heat source temperature controller 90 controls the amount of heat produced by regenerator 70, and air supply controller 92 controls the amount of air supplied by air pump or blower 74. Advantageously, air supply controller 92 also may control the amount of inert gas 80 supplied from source of inert gas 76.

Regeneration system 64 also may include a scrubber 82 that attaches to an outlet of filter system 10. Scrubber 82 collects pollutants generated during the regeneration process.

In operation, filter system 10 is regenerated once it collects enough soot to increase the back-pressure therein to a pre-determined point; a condition that may be determined by a pressure gauge (not shown) on filter system 10. At that stage, filter system 10 would be brought to a regeneration system 64, or vice versa, where regenerator 70 is quickly attached to filter system 10 at adaptor 54 opening 62, e.g., by using flange or valve 66. Second flange or valve 67 is closed to block flow of heated gas 72 and inert gas 80 to exhaust producing device 12. The temperature inside filter system 10 is tracked by thermocouple(s) 84 that feed back information to computer control system 78 for control of regenerator 70 and air supply controller 74.

As heat is applied to filter system 10 from regenerator 70, the soot will combine with the pumped-in heated gas 72 to burn and generate its own heat. The burning will propagate through filter system 10 and from unit 14 to unit 14 until all of the burnable soot is removed. The effluent from the burning soot may be cleaned by scrubber 82, if one is provided, and subsequently vented to the atmosphere. Thermocouple(s) 84 may be provided in each unit 14 to monitor temperature. Computer control system 78 may then prevent overheating by decreasing either the heat or the air supply or increasing the amount of inert gas to maintain a controlled burn rate.

After the regeneration process is complete, scrubber 82 and regenerator 70 are disconnected, flange/valve 66 closed, and flange/valve 67 opened for communication with exhaust producing device 12. Filter system 10 may then be re-used.

III. Combined Soot Removing System:

As also shown in FIG. 6, the invention also includes a soot removing system 98 that, in general terms, is a combination of aspects of filter system 10 and regeneration system 64. Soot removing system includes a filter, such as filter system 10, for removing soot from exhaust 52 of an exhaust producing device 12 and a regeneration system 64 having an electrically heated regenerator 70 for producing heated gas 72 to be passed through the filter to regenerate the filter. Aspect of the above-described systems that may be part of soot removing system include: source of inert gas 76 for supplying an inert gas 80, e.g., nitrogen, to the filter with hot gases 72; adaptor 54 for coupling to the filter for directing exhaust of exhaust producing device 12 or heated gas 72 from regenerator 70 through the filter. As discussed above, adaptor 54 preferably includes a first opening 56 coupled to a first end of the filter, a second opening 58 for coupling to an exhaust port 60 of exhaust producing device 12, a third opening 62 for coupling to regenerator 70; and a valve 66 for closing off second opening 58 during regeneration. A scrubber 82 may be attached to an output end of the filter.

Figure 7:
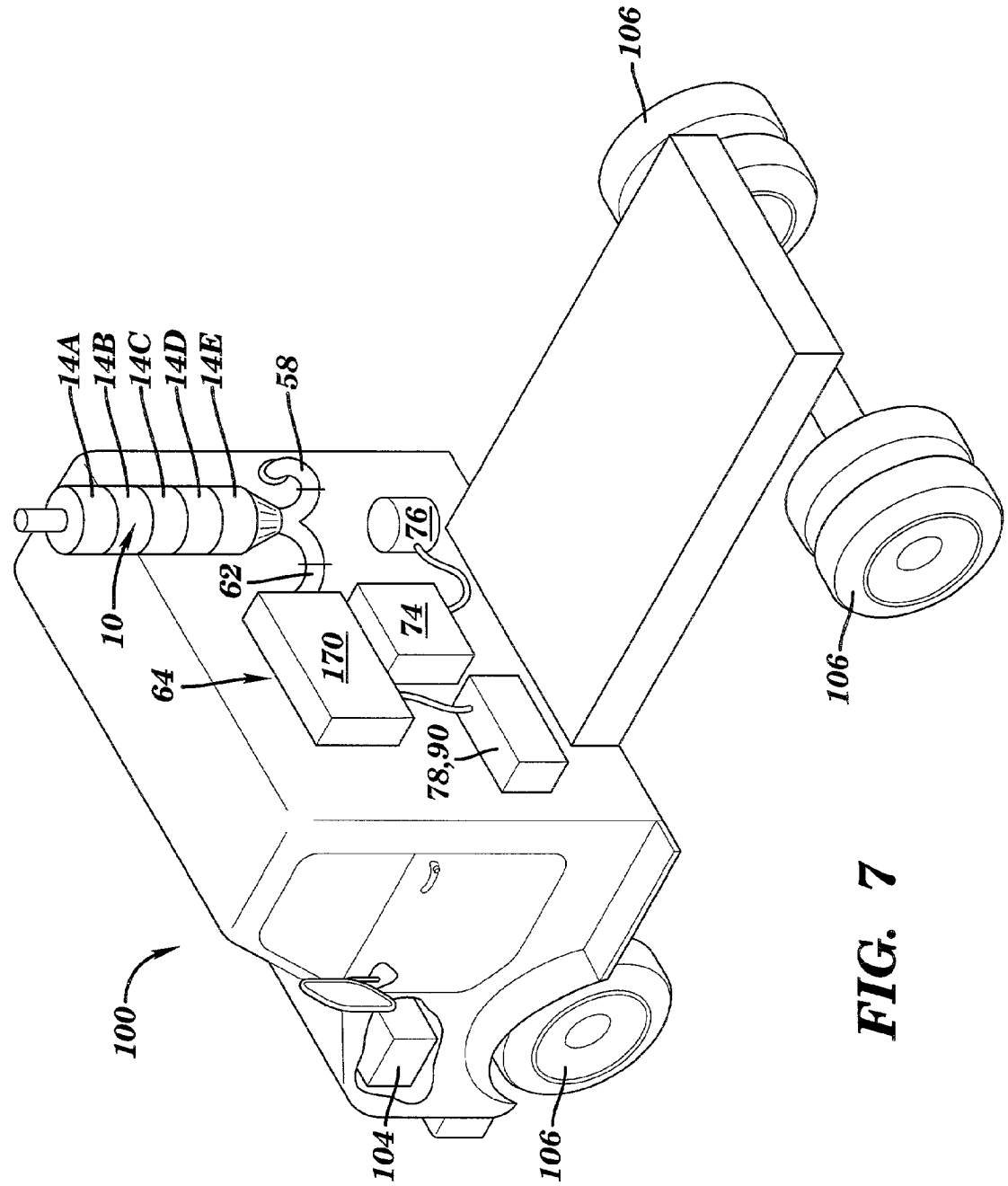
FIG. 7 is a motor vehicle incorporating the systems of the invention.

In a preferred embodiment, shown in FIG. 6, regenerator 70 is separate from exhaust producing device 12 and filter system 10. Alternatively, regenerator 70 may be attached to exhaust producing device 12, as shown in FIG. 7. Filter system 10 includes one or more units 14 including: a housing 22; a particulate filter section 24; and a nitrogen oxide filter section 26 having a gas-impervious inner cylinder 34 having a first and second open end 35 and a nitrogen-oxide removing catalyst 36 located within inner cylinder 34. Regenerator 70 includes a heat source chosen from the group comprising: an electric powered metal wire, an electric powered ceramic element and an electric powered intermetallic element. Regeneration system 64 includes an air pump or blower for pressurizing heated gas 72 and a computer-control system 78. Computer-control system 78 includes: a thermocouple 84 for measuring temperature in the filter during regeneration, a heat source temperature controller 90; and an air supply controller 92.

IV. Applications:

Filter system 10, regeneration system 64 and soot removing system 98 in accordance with the invention have applications with a variety of exhaust producing devices 12. For instance, exhaust producing device 12 may be: an engine, a paint booth, a furnace, a stove, a cement making kiln, an asphalt paving machine, etc. The types of engine the systems 10, 64, 98 may be applied to are limitless and include, for example, light and heavy duty diesel engines, one and two cylinder engines, two and four cycle engines, etc.

As shown in FIG. 7, another aspect of the invention is the application of the above systems to a motor vehicle 100 and, especially, a diesel powered motor vehicle. Motor vehicle 100 includes an engine 104 (i.e., an exhaust producing device) for driving ground engaging members 106, e.g., wheels or tracks; an exhaust filter 10 for removing soot from exhaust of engine 104, the filter including one or more attachable units 14 for varying the size of the filter; and an electrically heated regenerator 170 for producing heated gas to be passed through the filter to regenerate the filter. As illustrated, regeneration system 64 can be a part of motor vehicle 100. As an alternative, as illustrated in FIG. 6, regeneration system 64 may be a separate system to which a motor vehicle 100 is occasionally attached to, when necessary, for regenerating filter system 10.

When filter system 10 is used on a motor vehicle 100, units 14 may be housed in a metal shell 16, shown in FIG. 6, that is approximately the dimensions of a muffler, e.g., a diesel muffler, or can form the muffler themselves. For a typical heavy duty diesel truck, a stack of 3–4 segments would be mounted into a steel muffler shell 16 that would be mounted in place of a contemporary muffler. Alternatively, as shown in FIG. 7, units 14 may form the outermost shell of a filter/muffler themselves.

While a particular application of the invention has been discussed, it should be recognized that other applications are possible. For instance, the teachings of the invention may be applied to: heavy duty and light duty diesel engines such as used on trucks or trains; stationary diesel generators, mining vehicles, and power plants; smoke removal; and the collection and burning/oxidizing (rendering harmless) of Volatile Organic Compounds (VOCs) generated from for paint booths. Additional applications include smoke and hydrocarbon removal for cooking establishments; particulate removal for cement manufacturers; VOC and hydrocarbon emission prevention for asphalt paving equipment; etc.

Figure 8:
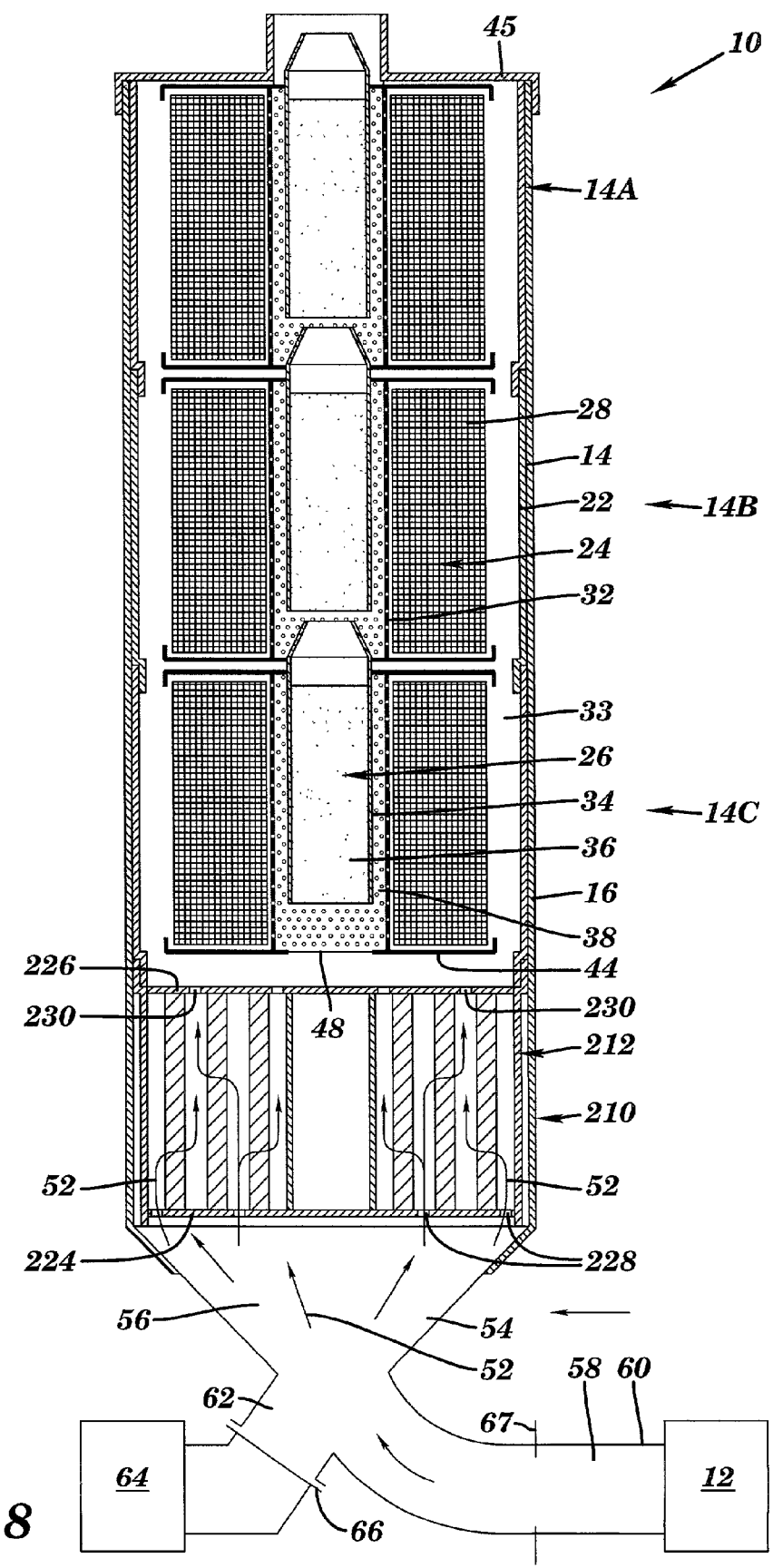
FIG. 8 is a cross-sectional view of a filter system in accordance with a second embodiment of the invention.
Figure 9:
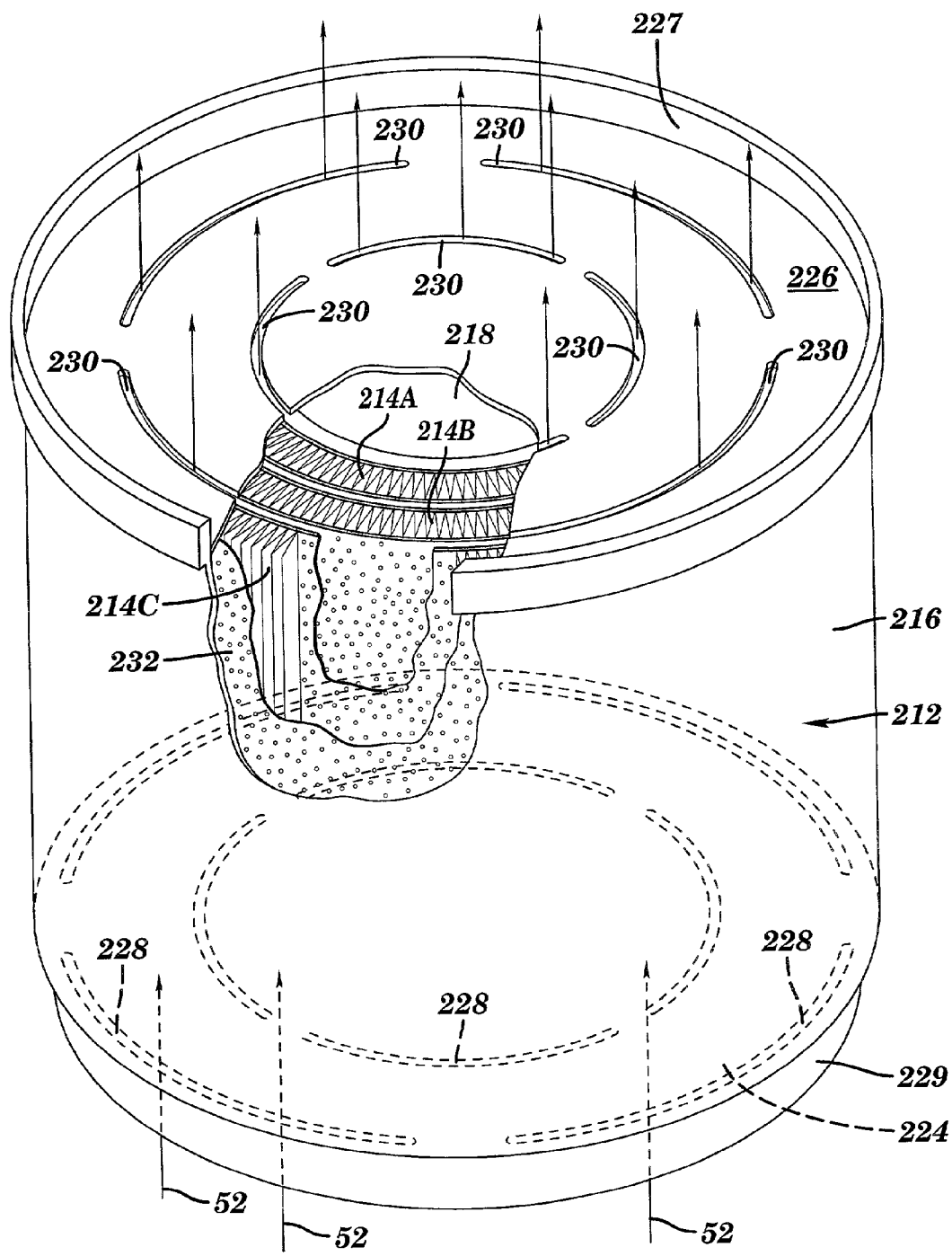
FIG. 9 is perspective view of a particulate filter used in the filter system of FIG. 8.
Figure 10:
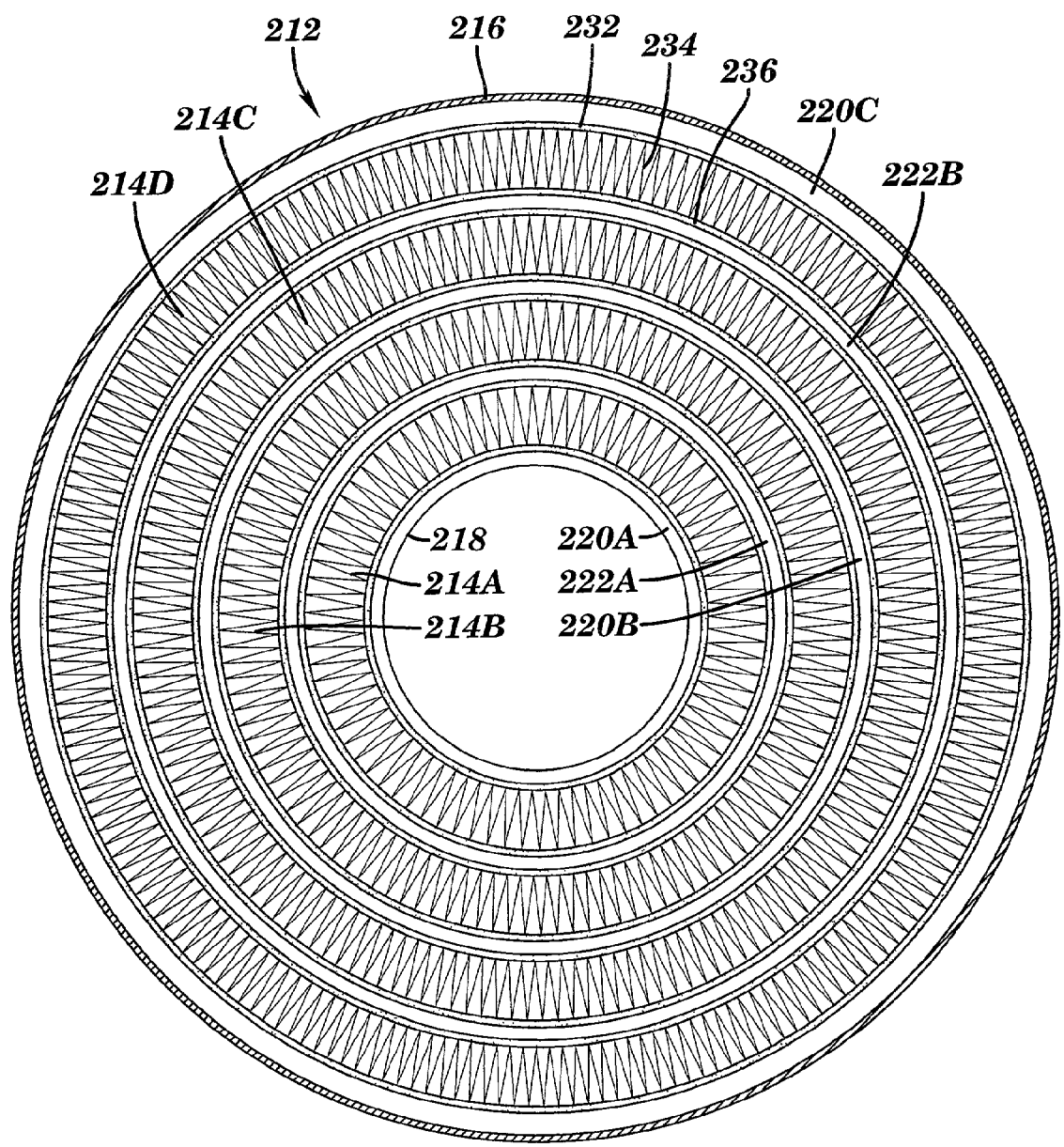
FIG. 10 is a cross-sectional view of the particulate filter of FIG. 9.

V. Particulate Filter Unit:

Referring to FIGS. 8–10, a particulate filter unit 210 is shown in use with the above-described systems. Filter unit 210 includes a housing; a plurality of concentrically arranged particulate filters within the housing; a plurality of first passages passing adjacent at least one particulate filter and opened only to a first end of the housing; and a plurality of second passages passing adjacent at least one particulate filter and opened only to a second end of the housing. Exhaust passes through one of the particulate filters as the exhaust moves from the first passages to the second passages.

As shown in FIG. 8, particulate filter unit 210 may couple between adaptor 54 and a lowermost unit 14C of the one or more units 14, described above. Units 14 will hereafter be referred to as "combination filter units" or "second stage units" for clarity. Combination filter units 14 are substantially identical to those described above. As will be described, particulate filter unit 210 is preferably used as a first stage unit to one or more subsequent second stage combination filter units 14. However, filter unit 210 may also be positioned anywhere in a sequence of units 14 including being the last unit in the sequence. If filter unit 210 is positioned in the middle of a sequence, a plenum or space (not shown) may be provided at the end of unit 210 to direct exhaust from central aperture 46 or vent port 49 (FIG. 1) of an immediately preceding combination filter unit 14. Similarly, a stop cap 44 may be provided on a subsequent unit 14 to direct exhaust to particulate filter section 24 properly.

Turning to FIGS. 9 and 10, filter unit 210 includes a housing 212 for enclosing a plurality of particulate filters 214A–D. Housing 212 is preferably formed of a metal and includes an outer, gas-impervious shell 216 and an inner, gas-impervious shell 218. Housing 212 also includes a first end 224 and a second end 226 that are substantially closed or capped, as will be described further. A coupling 227 (FIG. 9) for sequentially attaching filter unit 210 to an adjacent combination filter unit, e.g., unit 14C of FIG. 8, is also provided. A coupling 229 may be also provided for coupling to adaptor 54 or a preceding combination filter unit 14.

Each particulate filter 214A–D preferably includes an outer porous shell 232, a pleated or plated filter section 234 within outer porous shell 232, and an inner porous shell 236 within filter section 234. However, filter sections 234 may be sufficiently rigid so as to not require porous shells 232, 234. Filter sections 234 are constructed of substantially the same material as particulate filter section 24, i.e., ceramic fiber paper, ceramic cloth and ceramic woven fiber coated with a pre-ceramic polymer chosen from the group comprising: silicon carbide, oxycarbide, aluminosilicate and alumina.

Particulate filters 214 are concentrically arranged within housing 212 such that a number of passages 220A–C, 222A–C pass adjacent at least one particulate filter 214. A passage 220A is also formed between an innermost particulate filter 214A and inner shell 218, i.e., inner shell 218 is concentrically positioned within innermost particulate filter 214A. Likewise, a passage 222C is formed between an outermost particulate filter, e.g., filter 214D in FIG. 10, and outer shell 216. Additional passages 220B, 222A–B may similarly be formed between particulate filters 214, i.e., passage 222A is formed between filter 214A and filter 214B; passage 220B is formed between filter 214B and filter 214C; and passage 222B is formed between filter 214C and filter 214D. Particulate filters 214 abut, or are otherwise sealed against, respective first and second ends 224, 226 of housing 212 so that gas cannot pass about the ends of the filters.

First and second end 224, 226 of housing 212 include a number of openings 228, 230 that determine the passages that receive exhaust to be cleaned and those which exit cleaned exhaust. While openings 228, 230 are illustrated as being formed by apertures formed in a cap or endpiece of housing 212, it should be understood that openings 228, 230 may be formed in a variety of fashions. For instance, openings 228, 230 may be formed by coupling washer-shape plates to ends of adjacent particulate filters 214.

Since the number of particulate filters 214 and passages 220, 222 may vary (depending on factors such as the amount of particulate matter present in the exhaust, position of filter unit 210, etc.), the number of openings 228, 230 may vary. For instance, FIG. 9 shows three filters 214A–C with two intake and two output openings, and FIG. 10 shows four filters 214A–D having three intake openings and two output openings, or vice versa, two intake openings and three output openings. Hence, the number of intake openings 228 and output openings 230 may vary to accommodate different numbers of filters 214 and/or passages 220, 222.

The positioning of intake and output openings 228, 230 are such that an intake opening 228 provides exhaust to be cleaned to an intake side of at least one particulate filter and an output opening 230 exits the cleaned exhaust from an opposite, output side of at least one particulate filter. For instance, as illustrated, first end 224 of housing 212 includes a number of intake openings 228 that communicate oncoming exhaust 52 (from adaptor 54 or another combination filter unit 14) to a first set of the passages, e.g., passages 220. Similarly, second end 226 includes a number of output openings 230 that communicate cleaned exhaust from a second set of the passages, e.g., passages 222. Hence, the plurality of first passages 220 pass adjacent at least one particulate filter and are opened only to first end 224 of housing 212. Likewise, the plurality of second passages 222 pass adjacent at least one particulate filter and are opened only to second end 226 of housing 212.

It should be recognized that the passages to which openings 228, 230 are attached may be switched, i.e., passages 222 may be intake and passages 220 may be output. Depending on the number of filters 214, intake or output openings are also provided for an innermost passage 220A and/or an outermost passage, e.g., passage 220C (FIG. 10).

In operation, exhaust 52 delivered to first end 224 passes through an intake opening 228 of first end 224 of housing 212, through a passage 220, and through a first, intake side of a particulate filter 214. As the exhaust moves through particulate filter 214, the filter removes particulates from exhaust 52. The cleaned exhaust then exits a respective particulate filter 214 at an output side into a second passage 222. Thereafter, the cleaned exhaust exits from an output opening 230 in second end 226 of housing 212. Subsequently, the cleaned exhaust is passed to one or more subsequent dual-pass filters 14 or exits filter system 10, depending on the positioning of filter unit 210, as described above.

It should be understood that particulate filter unit 210 may be combined, modified and/or applied as described relative to preceding embodiments of the invention. For instance, regeneration system 64 is equally applicable to a filter system having filter unit 210.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A filter system for removing soot from exhaust of an exhaust producing device, the filter system comprising:
   one or more attachable units for varying a length of the filter system, each attachable unit including:
   a particulate filter unit; and
   one or more combination particulate and nitrogen oxide filter units, wherein each combination filter unit includes:
   a housing;
   a particulate filter section positioned within the housing; and
   a nitrogen oxide filter section having a gas-impervious inner cylinder spaced within the particulate filter section and a nitrogen-oxide removing catalyst positioned within the inner cylinder.

2. The filter system of claim 1, wherein, in each combination filter unit, exhaust gases pass radially through the particulate filter section and longitudinally through the nitrogen oxide filter section.

3. The filter system of claim 1, wherein the gas impervious cylinder has open ends and is spaced from an inner portion of the particulate filter section.

4. The filter system of claim 1, wherein the nitrogen oxide filter section is shorter in length than the particulate filter section.

5. The filter system of claim 1, wherein each combination filter unit further comprises:
   a porous cylinder for supporting an inner portion of the particulate filter section; and
   a first end cap for spacing the nitrogen oxide filter section concentrically within the particulate filter section.

6. The filter system of claim 1, wherein each combination filter unit further comprises a second end cap for spacing the nitrogen oxide filter section concentrically within the particulate filter section.

7. The filter system of claim 1, wherein the gas impervious cylinder includes a vent port for mating with an adjacent unit.

8. The filter system of claim 1, wherein the particulate filter section is spaced from an inner surface of the housing.

9. The filter system of claim 1, wherein the particular filter section is made of a material chosen from the group comprising: ceramic fiber paper, ceramic cloth and ceramic woven fiber.

10. The filter system of claim 9, wherein the particulate filter section includes one of a set of radially oriented plates of the material and a set of radially oriented pleats of the material.

11. The filter system of claim 9, wherein the material is coated with a pre-ceramic polymer chosen from the group comprising: silicon carbide, oxycarbide, aluminosilicate and alumina.

12. A filter system for removing soot from exhaust of an exhaust producing device, the filter system comprising:
   one or more attachable units for varying a length of the filter system, each attachable unit including:
   a first stage unit housing;
   a plurality of concentrically arranged particulate filters within the first stage unit housing;
   a plurality of first passages passing adjacent at least one particulate filter and opened to a first end of the first unit stage housing;
   a plurality of second passages passing adjacent at least one particulate filter and opened to a second end of the first stage unit housing;
   whereby exhaust passes through a particulate filter as the exhaust moves from the first passages to the second passages; and
   one or more second stage units, each second stage unit including:
   a second stage unit housing;
   a particulate filter section positioned within the second stage unit housing; and
   a nitrogen oxide filter section having a gas-impervious inner cylinder spaced within the particulate filter section and a nitrogen-oxide removing catalyst positioned within the inner cylinder.

13. The filter system of claim 12, wherein the first and second stage housings each include:
   an outer metal shell; and
   a coupling for sequentially attaching a unit to an adjacent unit.

14. A filter system for removing soot from exhaust of an exhaust producing device, the filter system comprising:
   one or more attachable units for varying the size of the filter system, each attachable unit including:
   a particulate filter unit including
   a particulate filter unit housing;
   a plurality of concentrically arranged particulate filters within the particulate filter unit housing;
   a plurality of first passages passing adjacent at least one particulate filter and opened to a first end of the particulate filter unit housing;
   a plurality of second passages passing adjacent at least one particulate filter and opened to a second end of the particulate filter unit housing;

whereby exhaust passes through a particulate filter as the exhaust moves from the first passages to the second passages; and one or more combination filter units each including:

a combination filter unit housing having an outer shell and a coupling adapted to attach a unit to an adjacent unit;
   a particulate filter section positioned within the combination filter unit housing;
   a porous cylinder for supporting an inner portion of the particulate filter section;
   a gas-impervious inner cylinder spaced within the porous cylinder; and
   a nitrogen oxide filter positioned within the inner cylinder,
   wherein exhaust gases pass radially through the particulate filter section and longitudinally through the nitrogen oxide filter.

15. The filter system of claim 14, wherein the plurality of particulate filters of the particulate filter unit and the particulate filter section of each combination filter unit are coated with a pre-ceramic polymer chosen from the group comprising: silicon carbide, oxycarbide, aluminosilicate and alumina.

* * * * *